Sept. 29, 1970    SABURO UEMURA ET AL    3,531,704
SPEED CONTROL SYSTEM FOR DC MOTORS
Filed Nov. 25, 1966
2 Sheets-Sheet 1

Inventors
Saburo Uemura
Toshiro Nishikawa
Yasuo Umezawa by Hill, Sherman, Meroni, Gross & Simpson Attys.

2A

2B

2C

2D

2E

Inventors
Saburo Uemura
Toshiro Nishikawa
Yasuo Umezawa by Hill, Sherman, Meroni, Gross & Simpson, Attys.

000

United States Patent Office 3,531,704
Patented Sept. 29, 1970

3,531,704
SPEED CONTROL SYSTEM FOR DC MOTORS
Saburo Uemura, Yokohama-shi, Toshiro Nishikawa, Tokyo, and Yasuo Umezawa, Yokohama-shi, Japan, assignors to Sony Corporation, Tokyo, Japan, a corporation of Japan
Filed Nov. 25, 1966, Ser. No. 597,108
Claims priority, application Japan, Nov. 26, 1965, 40/72,704
Int. Cl. H02p 5/06
U.S. Cl. 318—328     3 Claims

ABSTRACT OF THE DISCLOSURE

A speed control for a DC motor having a rotatable magnetic element which is used to generate a sine wave in response to the speed of the motor. The sine wave is detected and the detected signal is mixed with a portion of the original sine wave to produce pulses having a pulse width indicative of the frequency of the sine wave. The pulses are then used to control a switching amplifier circuit which, in turn, controls the speed of the motor.

BACKGROUND OF THE INVENTION

Field of the invention

The present invention is directed generally to a motor speed control, and more particularly to a motor speed control for DC motors for maintaining the output of the motor at constant speed. Specifically, the present invention is directed to a new and novel arrangement whereby the need for constant frequency oscillators is eliminated.

Description of the prior art

In general, speed control systems for controlling the speed of DC motors include a reference frequency signal which is generated from a reference frequency oscillator. The output of the oscillator is superimposed on a DC voltage having an amplitude proportional to the speed of the motor. The composite signal produced by the reference frequency signal and the DC voltage is clipped to produce pulses having a frequency equal to the reference frequency but having its pulse width modulated in response to the DC voltage. The pulse width modulated pulses are then used to control a switching device which, in turn, controls the speed of the motor. However, by utilizing the reference frequency oscillator of the prior art, the overall scheme of the motor speed control becomes complicated. Furthermore, fluctuations in frequency of the reference frequency oscillator cause variations in the speed of the motor. In addition, such DC speed control devices are relatively expensive, requiring high precision oscillators, and large in size.

SUMMARY OF INVENTION

Therefore, one of the primary objects of the present invention is to provide a DC speed control system which obviates the need for reference frequency oscillators.

Another object of the present invention is to provide a speed control system for DC motors which is simple and inexpensive.

Another object of the present invention is to provide a speed control system for DC motors wherein the speed of the motor is indicative of the current applied thereto.

Briefly, the motor control system of the present invention utilizes a signal translating surface which is rotatably connected to the motor under control to generate a sine wave frequency. This is accomplished by placing a sensing device in proximity with the signal translating surface to sense the movement of the surface. The sine wave generated by the signal translating surface and the sensing device is then applied to a control circuit which, in turn, controls the current delivered to the motor. One of the advantages of the present invention is that the need for reference frequency oscillators is eliminated.

Other objects, features and advantages will be more fully realized and understood from the following detailed description when taken in conjunction with the accompanying drawings in which like reference numerals throughout the various views of the drawings are intended to designate the similar elements or components and wherein:

DESCRIPTION OF THE PREFERRED EMBODIMENT

Figure 1:
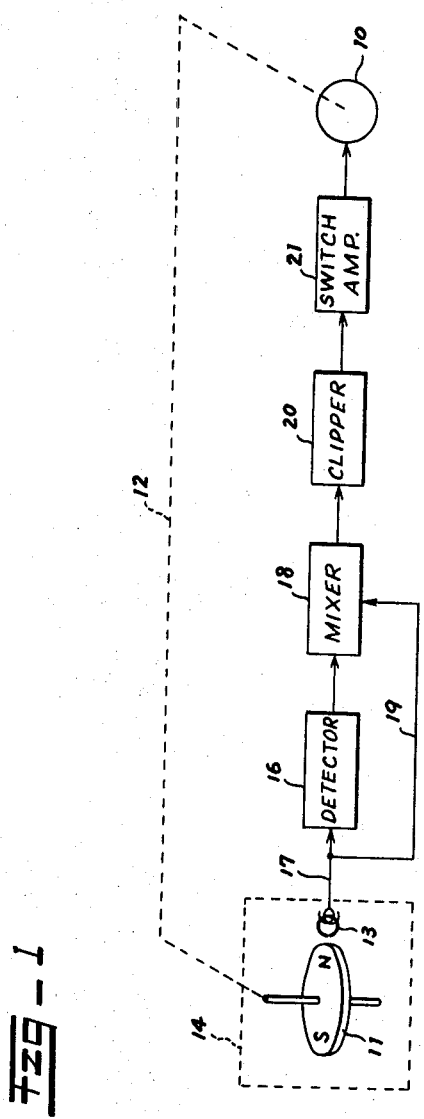
FIG. 1 is a block diagram illustrating one example of the speed control system for DC motors according to the present invention.

As seen in FIG. 1 a motor 10 is provided with a disc 11 which is rotatably connected to the motor as indicated by the broken line 12. A multi-gap magnetic head 13 is positioned in close proximity to the disc 11. The disc 11 is magnetized to have one or more magnetic poles as indicated by reference letters N and S. The magnetic disc 11 and the pick-up 13 form a signal generator 14 which may be mounted within the housing of the motor 10.

As the motor 10 rotates, so also does the disc 11 thereby generating electrical signal information at the head 13. Although the preferred embodiment shows a magnetic disc and a magnetic pick-up to generate electrical signal information, it will be understood that other suitable signal translating surfaces may be used. For example, a photocell may be used as the pick-up while a disc having colored areas may be used as the signal translating surface.

The electrical signal information developed by the magnetic head 13 is delivered to a detector 16 via a line 17. The output of the detector 16 is delivered to a mixer 18. Also, the electrical signal information developed by the magnetic head 13 is delivered to the mixer 18 via a line 19. The signals from the detector 16 and magnetic head 13 are combined in the mixer 18 and then delivered to a clipper 20.

The clipping level of the clipper 20 may be varied to control the amplitude of the output pulses therefrom. The pulses produced by the clipper 20 are then delivered to a switching amplifier 21 which, in turn, is connected to the motor 10.

Figure 2:
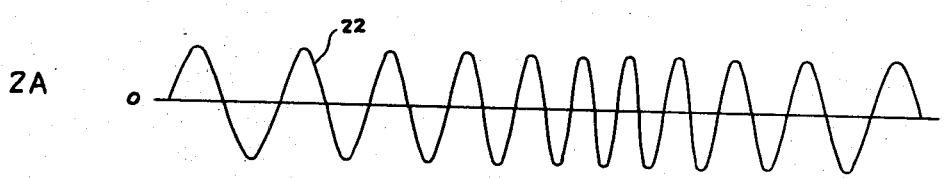
FIG. 2 illustrates a series of wave forms for explaining the operation of the control circuit of the FIG. 1.
Figure 2:
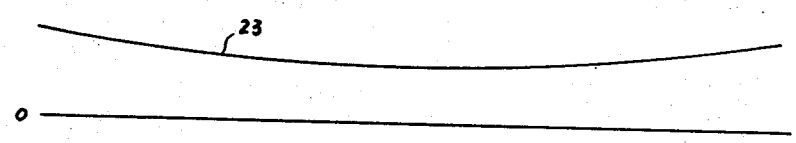
Figure 2:
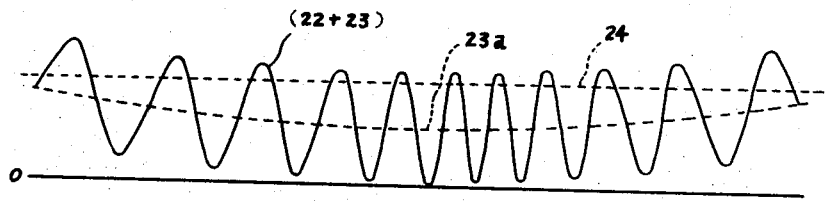
Figure 2:
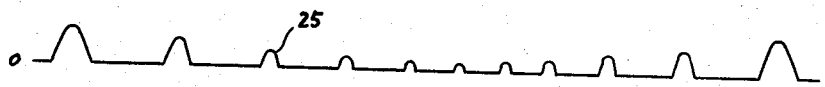
Figure 2:
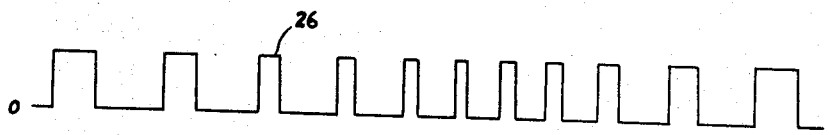

For a full and clear understanding of the operation of the control circuit of FIG. 1, reference is now made to FIG. 2. The electrical signal information developed by the magnetic head 13 is a sine wave 22, as seen in FIG. 2A. The sine wave 22 is delivered to the detector 16 wherein the sine wave is rectified to develop a DC voltage 23, as seen in FIG. 2B. It will be noted that the amplitude of the DC voltage 23 varies in response to the frequency of the sine wave 22. That is, at lower frequencies the amplitude of the DC voltage 23 is higher then at higher frequencies.

The DC voltage 23 is delivered to the mixer 18 together with the sine wave 22. A composite wave form 22+23 is developed by the mixer 18. As seen in FIG. 2C the composite wave form includes the sine wave 22 and the DC voltage 23. Therefore, the zero reference of the sine wave now varies about the DC voltage 23, as indicated by the broken line 23A.

The composite signal 22+23 is delivered to the clipper 20 wherein the peaks of the composite wave form are clipped at the level indicated by the broken line 24. The remaining top portion of the composite wave form 22+23 forms a series of pulses 25, as seen in FIG. 2D. It will be noted that the amplitude and width of the pulses 25 vary in accordance with the DC voltage 23. The pulses 25 are then delivered to the switching amplifier 21 wherein a series of square-wave current pulses 26 are developed in response to the pulses 25. The square-wave pulses are then delivered to the motor 10 to control the speed of the motor.

For example, should the speed of the motor decrease, the frequency of the sine wave 22 also decreases. This action will cause the width of the pulses 25 to increase, as seen in FIG. 2D to increase the width of the current square-wave and increase the power delivered to the motor 10. On the other hand, should the speed of the motor increase, so also will the frequency of the sine wave 22 increase. The increased frequency will cause the pulses 25 to become narrow as noted by the center portion of the pulses 25 in FIG. 2D. This action will decrease the width of the current square-wave 26 and decrease the power delivered to the motor 10. It should be noted, that by varying the level 24 at which the composite wave 22+23 is clipped, the speed of the motor 10 may be changed.

Therefore, the present invention has provided new and novel means for controlling the speed of a DC motor without the use of constant frequency reference oscillators. Although a preferred embodiment has been described herein, it will be understood that variations and modifications may be effected without departing from the spirit and scope of the novel concepts of this invention.

We claim:

1. A speed control system for a DC motor including means attached to said motor for rotation therewith, said means having at least one signal translating surface, signal generating means positioned to sense the movement of said signal translating surface to produce sine wave signals having a frequency proportional to the speed of rotation of said motor, detector receiving said sine wave signals to produce a DC voltage with amplitude inversely proportional to the frequency of said sine wave signals, a mixer receiving said sine wave signals and said DC voltage to produce a composite variable amplitude wave form, a clipper for receiving said composite wave form to generate pulses therefrom, said pulses having widths inversely proportional to the frequency of said sine wave signals, and a switching device connected to said motor to control the operation thereof in response to the width of said pulses.

2. A speed control system for a DC motor according to claim 1 wherein said pulses are square-wave shaped having the same amplitude.

3. A speed control system for a DC motor according to claim 1 wherein said means is a magnetic disk having plural magnetic poles thereon, and said signal generating means is a multigap magnetic head.

References Cited

UNITED STATES PATENTS

| 2,881,379 | 4/1959 | Logan | 318—328 |
| 3,059,163 | 10/1962 | Kinney et al. | 318—328 X |
| 3,234,447 | 2/1966 | Sauber | 318—327 |
| 3,390,316 | 6/1968 | Vichr | 318—325 |

ORIS L. RADER, Primary Examiner

R. J. HICKEY, Assistant Examiner